3,140,295
ESTERS OF 1,2-DICYANO-1,2-DIMER-CAPTOETHYLENE

Carl George Krespan, Wilmington, Del., assignor to E. I. du Pont de Nemours and Company, Wilmington, Del., a corporation of Delaware
No Drawing. Filed Feb. 17, 1960, Ser. No. 9,187
6 Claims. (Cl. 260—327)

This invention relates to new polysubstituted ethylenes and methods for their preparation.

A number of tetrasubstituted ethylenes have been described in the literature. Many of these compounds have unusual, and often unexpected, properties, with the result that they have found uses in a number of fields.

A new class of tetrasubstituted ethylenes has now been discovered which can be described generically as acyl derivatives of 1,2-dicyano-1,2-dimercaptoethylene and represented by the formula:

(1)

where R is selected from the group consisting of hydrocarbyl of up to 12 carbons (i.e., less than 13 carbons), chlorohydrocarbyl of up to 12 carbons and carbacyl (i.e., a moiety formed by removal of an OH group from the acidic moiety of a carboxylic or thiocarboxylic acid) of up to 18 carbons; R' is carbacyl of up to 18 carbons; and R and R' together can form a bivalent radical selected from the group consisting of carbonyl and thiocarbonyl.

These new acylated nitriles can be prepared in good yield by contacting a metal salt of cis-1,2-dicyano-1,2-dimercaptoethylene (e.g., disodium dimercaptomaleonitrile) under mild conditions with an acylating agent and in some cases also with a hydrocarbylating agent. The process is illustrated by the following equation, where R and R' are as defined above, M is a metal, preferably an alkali metal, and X is a halogen (i.e., fluorine, chlorine, bromine, or iodine):

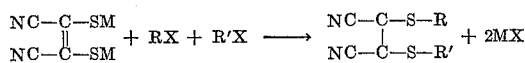

In case RX and R'X are different, the reaction can be conducted by a two-step procedure.

A convenient process for preparing the products of this invention consists in bringing disodium dimercaptomaleonitrile into intimate contact with a carbacyl halide in a liquid reaction medium which is inert, under the reaction conditions, to the reactants and product at a suitable temperature which is usually in the range of −10 to 100° C.; and maintaining the mixture at this temperature until the reaction is essentially complete as indicated by cessation of an exothermic reaction and the essential disappearance of at least one of the reactants. The reaction mixture is then worked up by appropriate means, generally by filtration from sodium halide, which usually separates during the reaction, followed by evaporation of the liquid reaction medium, thus leaving the desired acylated product as a residue. This product can be further purified by well-known means such as crystallization.

A slight modification of the above process provides products in which R and R' can be different. For example, in this modification disodium dimercaptomaleonitrile is treated as above with essentially an equimolar ratio of compound RX, wherein R and X are as above defined. This product, essentially of the formula

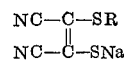

can be isolated by evaporation of the reaction medium as described above. This product, either with or without isolation, is then treated with R'X, wherein R' and X are as above defined, thus giving

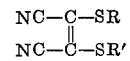

The metallic dimercaptomaleonitriles as a class are operable in the process of this invention but for economical reasons the disodium and dipotassium dimercaptomaleonitriles are preferred. Disodium dimercaptomaleonitrile can be prepared from carbon bisulfide and sodium cyanide by a method described by Bähr and Schleitzer, Chem. Ber. 90, 438 (1957).

Carbacyl halides (RX and R'X) operable in this invention can be represented more specifically by the formula

where Z represents oxygen or sulfur, X represents halogen, and Y represents halogen or monovalent alkyl, aryl, aralkyl, alkaryl, or alicyclic groups. Illustrative acyl halides are given in the subsequent examples.

Illustrative examples of hydrocarbyl, including chlorohydrocarbyl, halides (RX) operable in this invention are methyl iodide, ethyl bromide, benzyl chloride, n-dodecyl chloride, allyl bromide, cyclohexyl chloride, and p-chlorobenzyl chloride.

Liquids suitable for the reaction medium in the practice of this invention generally are those free of components which are reactive with carbacyl halides. Typical of these liquids are acetone, dioxane, 1,2-dimethoxyethane, chloroform, carbon tetrachloride, toluene, diethyl ether, petroleum ether, cyclohexane, ethyl acetate, nitromethane, acetonitrile, and dimethylformamide, but many other liquids can be used. In some instances the reaction can be carried out in aqueous media under conditions similar to those used for the well-known Schotten-Baumann reaction.

Temperature is not a critical factor in the practice of this invention. The preferred range is from about −10° C. to about +50° C., but other temperatures as low as −70° C. and as high as 100° C. or even higher can be used.

For convenience the reactions of this invention are conducted at normal atmospheric pressure, but pressures above and below atmospheric can be used. The reactor can be a vessel of simple design constructed of any corrosion-resistant material such as glass, ceramic ware or stainless steel and preferably provided with means for agitation, cooling, and heating and equipped to protect the charge from atmospheric contaminants.

In the preferred process of this invention the reactants are used in the proportions required by the stoichiometry of the chemical reaction but varying proportions can be used.

The formation of the acyl derivatives of dimercaptomaleonitrile of this invention is illustrated more explicitly in the following examples in which weights are given in grams unless otherwise specified.

EXAMPLE I

*4,5-Dicyano-1,3-Dithiolen-2-Thione*

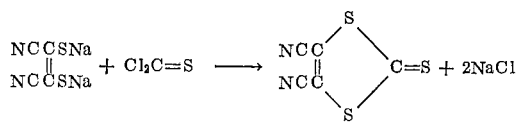

To a mixture of 25 g. (0.10 mole) of disodium dimercaptomaleonitrile and 100 ml. of chloroform was added 14 g. (0.12 mole) of thiophosgene. After the vigorous reaction subsided, the mixture was refluxed on the steam bath for three hours. The mixture was cooled and filtered. Dilution of the filtrate with 150 ml. of petroleum ether precipitated a tarry mass which was extracted several times with ether and with hot cyclohexane. On cooling, the extract deposited 3.7 g. (20% yield) of 4,5-dicyano-1,3-dithiolen-2-thione in the form of golden crystals, M.P. 125° C.

*Analysis.*—Calc'd for $C_5N_2S_3$: C, 32.59; N, 15.21; S, 52.20. Found: C, 32.84; N, 15.30; S, 52.37.

The infrared spectrum was consistent with the proposed structure.

EXAMPLE II

*Bis(Benzoylmercapto)Maleonitrile*

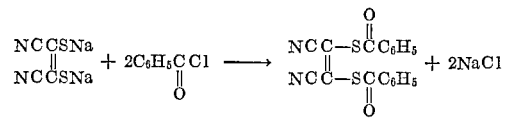

To a suspension of 3 g. (0.016 mole) of disodium dimercaptomaleonitrile in 30 ml. of 1,2-dimethoxyethane stirred in an ice bath was added over a 40-minute period 4.51 g. (0.032 mole) of benzoyl chloride in 5 ml. of 1,2-dimethoxyethane. The mixture was stirred an additional 1½ hours. It was then filtered. The filtrate was diluted with an equal volume of petroleum ether and chilled in Dry Ice. The dibenzoyl derivative separated as tan needles, M.P. 123–127° C. The yield was 4.0 g. (71%). After two recrystallizations from benzene, the melting point was 123–128° C.

*Analysis.*—Calc'd for $C_{18}H_{10}N_2O_2S_2$: C, 61.8; H, 2.86; N, 8.00. Found: C, 61.76; H, 3.09; N, 8.01.

EXAMPLE III

*4,5-Dicyano-1,3-Dithiolen-2-One*

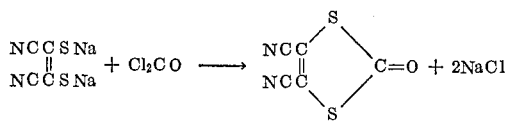

During a 25-minute period, 1.5 ml. (0.021 mole) of liquid phosgene dissolved in 30 ml. of 1,2-dimethoxyethane was added to an ice-cold suspension of 3 g. (0.016 mole) of disodium dimercaptomaleonitrile in 30 ml. of 1,2-dimethoxyethane. The reaction mixture was filtered and the filtrate was evaporated to dryness in vacuo, leaving a tan, crystalline solid behind. This was crystallized from cyclohexane to give 15 g. of tan needles (55% yield). After another crystallization from cyclohexane, the 4,5-dicyano-1,3-dithiolen-2-one melted at 122–124° C.

*Analysis.*—Calc'd for $C_5N_2OS_2$: C, 35.70; N, 16.67. Found: C, 36.54; N, 16.71.

EXAMPLE IV

*1-Benzoylmercapto-2-Methylmercaptomaleonitrile*

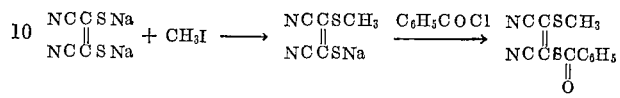

A solution of 12 g. (0.065 mole) of disodium dimercaptomaleonitrile in 35 ml. of methanol was stirred in an ice bath while 9.25 g. (0.065 mole) of methyl iodide in 10 ml. of methanol was added slowly over a 20-minute period. After an additional hour of stirring, the solution was evaporated to dryness in vacuo. The yellow residue consisting of a mixture of sodium iodide and sodium 1-mercapto-2-methylmercaptomaleonitrile was dried in a desiccator.

Six grams of this mixture was stirred in 30 ml. of 1,2-dimethoxyethane in an ice bath while 2.60 g. of benzoyl chloride in 5 ml. of 1,2-dimethoxyethane was added over a 10-minute period. The reaction mixture was filtered, and the filtrate was evaporated to dryness in vacuo. The product was extracted from the residue with boiling benzene. Partial evaporation of the benzene extract and dilution with cyclohexane caused separation of a red-brown oil which crystallized on standing in an ice bath. The yield was 2.91 g. (60%), M.P. 90–108° C. After two recrystallizations from methanol, the product was a light tan, crystalline solid, M.P. 111–112.5° C.

*Analysis.*—Calc'd for $C_{12}H_8N_2OS_2$: C, 55.43; H, 3.10; N, 10.78. Found: C, 55.76; H, 3.30; N, 10.97.

The monomethyl sodium mercaptomaleonitrile and benzoyl chloride were used in equimolar amounts. Instead of adding the methyl iodide and benzoyl chloride separately, they can be added simultaneously to disodium dimercaptomaleonitrile.

EXAMPLE V

*Bis(2,3,6-Trichlorobenzoylmercapto)Maleonitrile*

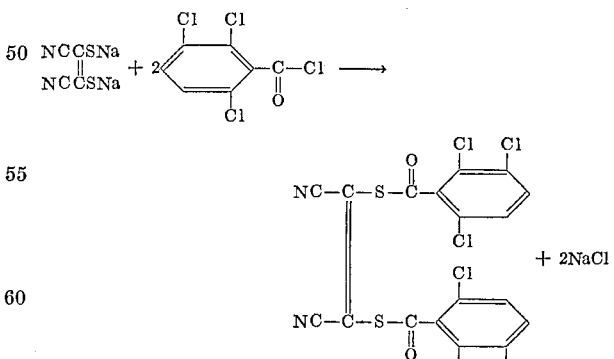

To a solution of 4.65 g. (0.025 mole) of disodium dimercaptomaleonitrile in 20 ml. of anhydrous methanol was added 12.2 g. (0.05 mole) of 2,3,6-trichlorobenzoyl chloride. The solution was stirred for 3 hours at 20–30° C. during which time a tan solid separated. It was collected by filtration and recrystallized from acetonitrile to give 4.5 g. of bis(2,3,6-trichlorobenzoylmercapto)-maleonitrile as white needles, M.P. 138–140° C.

*Analysis.*—Calc'd for $C_{18}H_4Cl_6N_2O_2S_2$: C, 38.8; H, 0.72; N, 5.03. Found: C, 38.70; H, 0.83; N, 4.97.

EXAMPLES VI–XV

By the process of foregoing Example II, other acylated 1,2-dicyano-1,2-dimercaptoethylenes illustrated in Table I are preparable by reacting disodium dimercaptomaleonitrile with the acyl halides of column 2 to give the acylated 1,2-dicyano-1,2-dimercaptoethylenes shown in column 3.

TABLE I

| Example | Acyl Halide | NCC–SR‖NCC–SR' R— and R'— |
|---|---|---|
| VI | $CH_3COCl$ | $CH_3CO-$ |
| VII | $n-C_3H_7COCl$ | $n-C_3H_7CO-$ |
| VIII | $n-C_{17}H_{35}COCl$ | $n-C_{17}H_{35}CO-$ |
| IX | $CH_3(CH_2)_7CH=CH(CH_2)_7COCl$ | $CH_3(CH_2)_7CH=CH(CH_2)_7CO-$ |
| X | $C_6H_5CH_2COCl$ | $C_6H_5CH_2CO-$ |
| XI | $C_6H_5CH=CHCOCl$ | $C_6H_5CH=CHCO-$ |
| XII | $CF_3COCl$ | $CF_3CO-$ |
| XIII | $NCCH_2COCl$ | $NCCH_2CO-$ |
| XIV | $(CH_3)_2NCOCl$ | $(CH_3)_2NCO-$ |
| XV | $C_6H_5CSCl$ | $C_6H_5CS-$ |

EXAMPLES XVI–XIX

By the process of foregoing Example IV other hydrocarbylated, including chlorohydrocarbylated, acylated 1,2-dicyano-1,2-dimercaptoethylenes as illustrated in Table II can be prepared.

TABLE II

| Example | Halides | NCC–SR‖NCC–SR' | |
|---|---|---|---|
| | | R— | R'— |
| XVI | $C_2H_5Br$ / $iso-C_3H_7COBr$ | $C_2H_5-$ | $iso-C_3H_7CO-$ |
| XVII | $p-ClC_6H_4CH_2Br$ / $CCl_3COCl$ | $p-ClC_6H_4CH_2-$ | $CCl_3CO-$ |
| XVIII | $CH_2=CHCH_2Br$ / $p-ClC_6H_4COCl$ | $CH_2=CHCH_2-$ | $p-ClC_6H_4CO-$ |
| XIX | $n-C_{12}H_{25}Br$ / $n-C_3F_7COCl$ | $n-C_{12}H_{25}-$ | $n-C_3F_7CO-$ |

Note that in Examples I through XIX a preferred metal salt of a 1,2-dicyano-1,2-dimercaptoethylene is an alkali metal salt. Also, in Example I those skilled in the art will appreciate that in place of the thiophosgene any thiocarbonyl halide can be used. Similarly, in Example II instead of the benzoyl chloride, any benzoyl halide can be used; instead of the phosgene in Example III, any carbonyl dihalide can be used; in Example IV instead of the methyl iodide, any methyl halide can be used, and instead of the benzoyl chloride, any benzoyl halide can be used; and, finally, in Example V instead of the 2,3,6-trichlorobenzoyl chloride, any 2,3,6-trichlorobenzoyl halide can be used. In Examples VI through XIX other halides can be substituted for those specifically used.

The new acylated dimercaptomaleonitriles of this invention are useful pest control agents. Thus, in tests conducted with sprays of the 4,5-dicyano-1,3-dithiolen-2-one of Example III at 1% concentration in acetone, 100% of German roaches, bean aphids, and two-spotted mites and 98% of flies were killed. The compound also showed activity as an anti-bacterial agent. In like tests the 4,5-dicyano-1,3-dithiolen-2-thione of Example I killed 100% of bean aphids and two-spotted mites and 94% of flies. The bis-(benzoylmercapto)maleonitrile of Example II killed 100% of two-spotted mites at 1% concentration.

When the compounds of this invention are used as pest control agents those skilled in the art will appreciate that the compounds can be composited with the appropriate pest control adjuvants or modifiers to provide compositions in the form of solutions, dusts, water dispersible powders and aqueous dispersions or emulsions.

Such compositions, especially the liquids and wettable powders, usually contain as a conditioning agent one or more surface active agents in amounts sufficient to render a given composition dispersible in water or possibly in oil.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

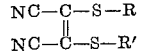

where R' is carbacyl of up to 18 carbons and selected from the group consisting of unsubstituted hydrocarboncarbonyl, chlorohydrocarboncarbonyl, fluorohydrocarboncarbonyl, cyanohydrocarboncarbonyl, dialkylaminecarbonyl, and unsubstituted hydrocarbonthiocarbonyl; R is a monovalent radical selected from the group consisting of alkyl of up to 12 carbons, cycloalkyl of up to 6 carbons, benzyl, allyl, chlorobenzyl, and carbacyl as above defined for R'; and R and R' together form a bivalent radical selected from the group consisting of carbonyl and thiocarbonyl.

2. 4,5-dicyano-1,3-dithiolen-2-thione.
3. Bis(benzoylmercapto)maleonitrile.
4. 4,5-dicyano-1,3-dithiolen-2-one.
5. Bis(2,3,6-trichlorobenzoylmercapto)maleonitrile.
6. 1-benzoylmercapto-2-methylmercaptomaleonitrile.

References Cited in the file of this patent

UNITED STATES PATENTS

| 2,826,600 | Driver | Mar. 11, 1958 |
| 2,857,399 | Fields | Oct. 21, 1958 |
| 2,888,480 | Neher et al. | May 26, 1959 |
| 2,905,696 | Fields | Sept. 22, 1959 |
| 2,911,414 | Simmons | Nov. 3, 1959 |
| 2,923,716 | Bossert | Feb. 2, 1960 |
| 2,976,296 | Van Schoor et al. | Mar. 21, 1961 |

FOREIGN PATENTS

| 1,060,655 | Germany | July 2, 1959 |